Figure 1:
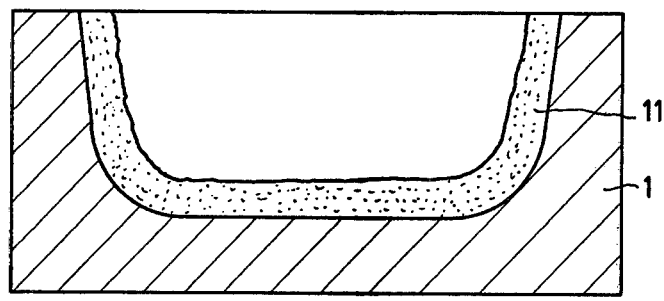

United States Patent [19]

Clasen et al.

[11] 4,286,981

[45] Sep. 1, 1981

[54] MOULD WITH SEPARATING LAYER FOR THE PRODUCTION OF GLASS OBJECTS

[75] Inventors: Rolf Clasen, Aachen; Hans J. Lydtin, Stolberg, both of Fed. Rep. of Germany

[73] Assignee: U.S. Philips Corporation, New York, N.Y.

[21] Appl. No.: 34,097

[22] Filed: Apr. 27, 1979

[30] Foreign Application Priority Data

May 19, 1978 [DE] Fed. Rep. of Germany ....... 2821871

[51] Int. Cl.³ .............................................. C03B 9/347
[52] U.S. Cl. .......................................... 65/169; 65/23; 65/26
[58] Field of Search ............... 65/23, 26, 169

[56] References Cited

U.S. PATENT DOCUMENTS

| | | | |
|---|---|---|---|
| 2,201,049 | 5/1940 | Moore | 65/26 |
| 2,573,337 | 10/1951 | Hyde | 65/26 X |
| 3,103,428 | 9/1963 | Stello et al. | 65/169 X |
| 3,244,497 | 4/1966 | Gopeland | 65/26 X |
| 4,003,867 | 1/1977 | Cooper et al. | 65/26 X |

FOREIGN PATENT DOCUMENTS

| | | |
|---|---|---|
| 1310570 | 7/1961 | France .......................................... 65/26 |
| 382160 | 10/1932 | United Kingdom . |
| 508295 | 6/1939 | United Kingdom . |
| 1175838 | 12/1969 | United Kingdom . |
| 1504765 | 3/1978 | United Kingdom . |
| 1543954 | 4/1979 | United Kingdom . |

*Primary Examiner*—Arthur D. Kellogg
*Attorney, Agent, or Firm*—Thomas A. Briody; Robert T. Mayer; Paul R. Miller

[57] ABSTRACT

A layer consisting of a grinding medium such as corundum, SiC, emery or quartz sand is provided in a mould for the production of glass objects. A portion of this layer sticks to the glass work piece formed in this mould and is used for a subsequent surface processing procedure.

9 Claims, 4 Drawing Figures

MOULD WITH SEPARATING LAYER FOR THE PRODUCTION OF GLASS OBJECTS

The invention relates to a mould for the production of glass objects with a high surface quality with a separating layer being present between the mould and the glass blob to be processed.

Decisive factors in the production of glass products are the properties of the surface, the homogeneity of the glass, and the accurate reproduction of the shape. When processing is done by machine a mould is generally used in which hot glass is moulded to obtain in particular an accurate reproduction of the form. This is accompanied by interaction between the glass melt which has a temperature of approximately 1000° C. and the mould which, as a rule, has a lower temperature.

The mould which may be any mould suitable for any type of glass processing method, for example, moulds for blowing or casting or pressing or centrifugal moulding must have the property that glass does not stick to the mould after shaping so that the produced glass object can be easily removed from the mould. The elimination of these sticking phenomena is the actual problem in the heat treatment of glass as the majority of materials used for moulds are wetted by the glass at elevated temperatures. This may be influenced to a very great extent by oxide layers which are formed at the surface of the mould material at elevated temperatures and are dissolved by liquid glass. This causes the glass to stick to the mould surface and simultaneously the highly stressed surface area is corroded, so that renewal of the geometry of the mould may already be necessary after a short period of time.

Many different methods have been tried to solve the sticking problems encountered in processing a molten piece of glass. From German Patent Specification No. 25 33 745 it is, for example, known to coat a mould for the production of bulbs for incandescent lamps with a thin layer of cork powder.

Bulbs for incandescent lamps are produced by means of a so-called stationary blowing procedure wherein the molten glass is blown into the mould by means of air. The cork powder carbonizes when it contacts the hot glass and the work piece does not stick to the mould when the lamp bulb is blown. To improve the surface quality of the produced glass object as well as to influence the temperature gradient between the cold form and the hot glass, a vapour film is furthermore produced between the glass and the mould by introducing moisture into the mould, which also reduces the adhesion of the glass to the mould and which can contribute to a control of the temperature gradient. This method has the drawback that the relatively thin layer of cork powder is used up, so that the mould itself corrodes and must be revised.

Such a coating is absolutely not suitable for moulds to be used in a pressing procedure for the production of heavier glass objects, for example screens or cones of a picture tube, since the protecting layer wears even quicker and surface structures are imprinted owing to the high pressure. Stronger layers for the production of heavy pressed glass objects, which operate on the same principle as the cork powder layer, also with the simultaneous use of moisture, are disclosed in, for example, German Patent Specification No. 25 33 745, which describes porous layers of hollow-glass powder or enamel having a porosity of 30 to 70%. These layers have the drawback that sticking of the glass is exclusively eliminated by the water vapour layer, the hollow-glass powder is melted by the molten glass and penetrates into the surface of the workpiece. The water vapour layer may form non-uniform gas bubbles which result in an ondulated surface.

For completeness it should be noted that it is known to use moulds of vitreous carbon (German Patent Specifications Nos. 21 57 803 and 23 56 977) for the production of high-grade glass surfaces. Owing to the isotrope structure of this material as well as to the known fact that carbon does not stick to glass up to temperatures of approximately 1100° C., a satisfactory shape with excellent surfaces can be obtained with this method.

It has, however, the drawback that due to the conditions of the manufacturing process of the vitreous carbon only materials with small thickness can be obtained, so that only small pressing moulds can be made.

It is an object of the present invention to provide moulds which do not have the drawbacks of the prior art moulds and which are particularly suitable for the production of also bigger, heavier glass objects, whose surface quality can satisfy high requirements, wherein the blob of molten glass to be processed is prevented from sticking to the mould and the subsequent further processing procedure of the glass object is considerably simplified.

According to the present invention this object is accomplished by means of a separating layer in the form of a defined wear layer consisting of high-melting, corrosion and scale-resistant granular material, having a hardness $\geq 7$ on the hardness scale according to Mohs, having a layer thickness in the range from 10 $\mu$m to 2 cm and being embedded in an organic binder which evaporates, melts or decomposes at a temperature $>200°$ C.

The feature "defined wear layer" must be understood to mean that the separating layer is subjected to a defined wear during the glass forming process.

According to a preferred embodiment of the present invention a portion of the separating layer consists of carbon obtained by heating the surface of the layer and, consequently, carbonization of the binder.

Preferably the separating layer consists of a suspension of a grinding agent as, for example, quartz sand having an average grain size of 5 $\mu$m in an organic binder in the form of a 20% solution of phenol formaldehyde resin in methanol, provided on the inner surface of the mould which is in contact with the blob of glass to be formed.

According to another preferred embodiment of the invention the separating layer consists of a plurality of layers which are disposed consecutively, the binder at the surface of each layer being converted into carbon by means of heating.

This has the advantage that defined areas of the separating layer of the work piece formed in the mould stick to the glass and can be used in a profitable manner in a subsequent surface processing of the work piece, for example a grinding operation.

The advantages obtained by means of the present invention particularly consist in that a mould has been provided which is suitable for all glass forming techniques, which does not only exclude the possibility that the glass blob to be formed sticks to the mould but which also furnishes an extraordinary simplification of the further processing of glass products whose surface quality must satisfy heavy requirements as the material of the wear layer which sticks to the glass product after it has been removed from the mould can immediately be used as grinding and polishing agent for the further processing of the glass object. Particularly for large-scale series production this advantage contributes advantageously towards economic production.

By embedding foreign particles of a material which does not alter its structure on contact with the hot glass melt and which is harder than glass in the glass surface this surface has a porous structure after the particles have been removed and can be reduced in a considerably easier manner, that is to say, for example, by grinding, as would be possible for a compact closed glass surface, the removed foreign particles simultaneously being usable as a material for processing the surface of the glass work piece.

Figure 3:
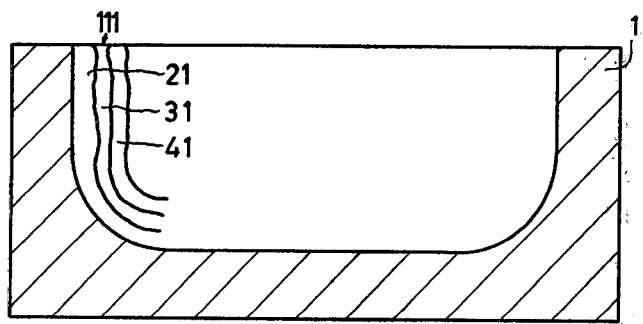
Figure 4:
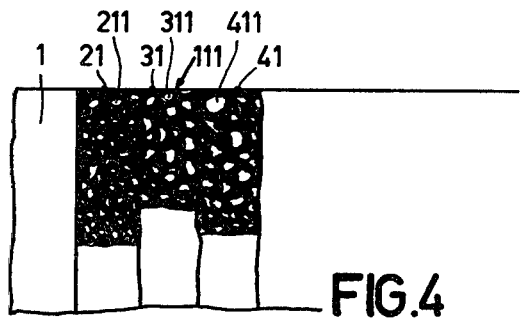

An embodiment of the invention will now be furnished explained with reference to the accompanying drawing. In this drawing FIG. 1 shows a cross-section of a mould provided with a separating layer according to the invention for the production of glass objects, FIG. 2 shows a cross-section of a glass object taken from a mould shown in FIG. 1 before further processing by means of grinding, FIG. 3 shows a cross-section of a separating layer consisting of a plurality of layers on a mould, FIG. 4 shows an enlarged view of the plurality of layers shown in FIG. 3.

Figure 2:
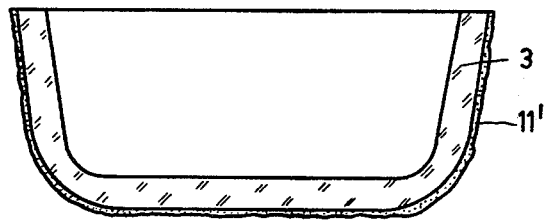

FIGS. 1 and 2 show respectively a cross-section of a mould 1, for example a pressing mould, and a glass object 3 taken from this pressure mould.

The separating layer 11 provided on the inner surface of the mould which comes into contact with the glass blob to be formed is shown with an exaggerated thickness.

In a known manner a glass blob (not shown in the drawing) to be formed is fed into the glass mould 1 by means of a stream of liquid glass flowing from a glass melt tank by a feeder, and the glass is being divided mechanically by means of a cutting device into blobs which fall into the mould for further processing.

The separating layer 11 of the mould 1 has the property that at least a portion of the blob intended for hot pressing sticks to it, and this portion is removed from the mould together with the final-formed work piece.

FIG. 2 shows such a work piece 3 with a portion 11' of the layer 11.

The portion 11' of the separating layer which sticks to the work piece 3 is used, after removal from the mould, as a grinding and polishing agent for smoothing the surface of the work piece 3.

It is important that the granular material of the separatimg layer does not change its structure, even when it is heated by the liquid glass, and that the mechanical hardness of this material is greater than that of the glass which comes into contact with it. Owing to the fact that particles of the separating layer 11 are embedded, these particles thereafter being removed by means of grinding process, the glass surface gets a structure having a considerable surface roughness. It is considerably easier to grind and polish such a glass object in a subsequent processing operation then a glass object having a compact surface.

The layer 11 is regularly renewed in the mould 1 without great expense. The layer can be made in the form of a single layer or with a larger layer thickness with a plurality of layers (see FIGS. 3 and 4) and consists of a granular material which is either poured loose into the mould or fixed in a binder. All the materials such as, for example, $SiO_2$ (quartz sand), SiC, $Al_2O_3$ etc. which are known as grinding and polishing means in glass processing are particularly suitable.

The practical use of the mould according to the invention will be explained with reference to two embodiments:

It is known to use moulds consisting of, for example, wood, iron, cast iron, aluminium, hard carbon, electrographite, vitreous carbon, porous sintering metals or steel for forming glass products. All the mould materials suitable for a glass manufacturing process can be used for coating the mould with a separating layer in accordance with the invention. The separating layer can be formed from the above-mentioned pulverized hard materials with an average grain size of 5 $\mu$m being preferred.

The material of the separating layer can be sprinkled in the form of a dry powder on the inner surface of the mould which has been provided with an agent, for example a film of water, to promote sticking.

In an alternative method the particles of the separating layer material can first be embedded in a suitable binder. Binders which carbonize when being heated are particularly suitable for this purpose, whereby the carbon layer formed in that manner is removed by burning on contact with the hot liquid glass and the particles of the granular material at the surface of the separating layer are released and can be used in a profitable manner for a subsequent surface processing procedure.

EXAMPLE I

Fine quartz sand having an average grain size diameter of 5 $\mu$m is uniformly coated with an organic binder by making a 20% solution of phenol formaldehyde resin in methanol wherein the quartz sand is dissolved. This suspension is sprayed through a nozzle into a large storage container with cold water of approximately 5° to 10° C., causing the solvent of the binder to spread through the water and a uniform skin of binder material to be deposited on the fine quartz particles. The enclosed quartz particles are filtered off and dried for 10 hours at 50° C. Thereafter the dried compound is made into a mouldable paste by means of a small quantity of methanol and poured into the glass mould. The layer thickness of the layer thus produced is preferably in the order of magnitude of 1 mm. Thereafter the binder is carbonized by slowly heating the mould to 1000°0 C. in 5 hours in a nitrogen ($N_2$) atmosphere.

When the hot liquid blob is poured onto the heated separating layer the carbon is particularly removed by burning so that a fine layer of binder-free quartz sand is embedded in the surface of the pressed glass object. This rough surface of the glass work piece can be polished in a particularly easy manner with the aid of the quartz sand particles embedded in the glass surface.

EXAMPLE II

Corundum powder having an average grain size of 25 $\mu$m is sprinkled on a flat ceramic mould, for example consisting of oxidic ceramic material in the form of sintered $Al_2O_3$ and thereafter a hot glass blob is pressed thereon. The corundum powder is also embedded in the surface of the work piece and enables easy grinding of the glass surface.

To produce the separating layer 4 g epoxy resin is mixed with 10 g corundum powder of the above-mentioned grain size; this mixture is applied onto the ceramic mould in a layer thickness of a few mm and slowly heated in a nitrogen (N₂) atmosphere to 1100° C. in 5 hours, wherein the epoxy resin is carbonized. When the liquid glass blob is poured onto the preheated separating layer free corundum powder is embedded in the surface of the glass work piece which enables a subsequent surface processing procedure without great expense.

Alternatively, the separating layer can be formed by means of a plurality of layers. FIGS. 3 and 4 show a cross-section of such a multi-layer separating layer 111 with individual layers 21, 31 and 41 on a mould 1. The procedure is as follows: first of all the layer 21 which is 10 mm thick is applied in the form of a suspension of, for example, quartz sand of an average grain diameter of 5 μm in phenol formaldehyde resin/methanol (see example I) on the inner surface of the mould 1 to be coated and thereafter carbonized by heating it for 5 hours at 1000° C. In this manner the total quantity of organic binder which envelopes the grinding means (for example quartz sand) is carbonized. This carbonized first individual layer 21, 211 is provided in the same manner as for layer 21 with a second layer 31 which is also carbonized; a second carbon layer 311 is formed. This carbon layer 311 of the layer 31 is provided with a further layer 41 by means of the same method as used for the layer 21 and 31 and is also carbonized to form a carbon layer 411.

This multi-layer structure has the advantage that each of the defined layers 21, 31, 41 of the separating layer 111 sticks to the liquid blob which is disposed in the mould and must be further processed. Namely, it appeared that exactly in the boundary between the individual layers, for example 211 and 311, and the subjacent partial layers 21 and 31 the layer material which sticks to the glass work piece is easily separated from the layer material sticking to the form so that it is possible to speak of a defined wear of the inner coating and the separating layer, respectively, in a glass mould.

It is also possible to achieve carbonizing of the separating layer by the mere contact of the hot liquid glass with the surface area of the separating layer. This type of carbonization can be recommended for a thicker single layer; see, for example, FIG. 1.

What is claimed is:

1. A mould for producing glass objects comprising a mould body for molding a glass blob, and a separating layer formed between said mould body and said glass blob to be formed, said separating layer comprising a defined wear layer of a high melting, corrosion and scale resistant pulverized granular material having a hardness ≧7 Mohs and an organic binder into which said material is embedded, said organic binder being converted into carbon at least at a surface of said layer in contact with said glass blob, and said layer having a thickness ranging from 10 um to 2 cm, whereby on contact said glass blob receives particles of said granular material.

2. A mould according to claim 1, wherein said separating layer includes at least a portion of carbon produced by heating at least a surface of said separating layer.

3. A mould according to claim 2, wherein said granular material includes a grinding medium of at least one of corundum, silicon carbide, emery or quartz sand having an average grain size ranging from 2 to 50 um.

4. A mould according to claim 3, wherein said separating layer includes a suspension of quartz sand having an average grain diameter of 5 um in said organic binder, said organic binder being a 20% solution of phenol formaldehyde resin in methanol.

5. A mould according to claim 1, wherein said granular material includes a grinding medium of at least one of corundum, silicon carbide, emery or quartz sand having an average grain size ranging from 2 to 50 um.

6. A mould for producing glass objects comprising a mould body for moulding a glass blob, and a multi-layer separating medium formed between said mould body and said glass blob to be formed, said separating medium comprising layers of high melting, corrosion and scale resistant granular material having a hardness of ≧7 Mohs and an organic binder into which said material is embedded, said binder being converted into carbon at the surface of each of said layers by heating, wherein said binder evaporates, melts or decomposes at temperatures greater than 200° C. and said layers have thicknesses ranging from 10 um to 2 cm.

7. A mould according to claim 6, wherein said grannular material includes a grinding medium of at least one of corundum, silicon carbide, emery or quartz sand having an average grain size ranging from 2 to 50 um.

8. A mould according to claim 6, wherein said layers include a suspension of quartz sand having an average grain diameter of 5 um in said organic binder, said organic binder being a 20% solution of phenol formaldehyde resin in methanol.

9. A mould for producing glass objects comprising a mould body for molding a glass blob, and a separating layer formed between said mould body and said glass blob to be formed, said separating layer comprising a defined wear layer of a high melting, corrosion and scale resistant granular material having a hardness ≧7 Mohs and an organic binder into which said material is embedded, said binder evaporating, melting or decomposing at temperatures greater than 200° C., and said layer having a thickness ranging from 10 um to 2 cm, wherein said separating layer includes a suspension of quartz sand having an average grain diameter of 5 um in said organic binder, said organic binder being a 20% solution of phenol formaldehyde resin in methanol.

* * * * *